Dec. 2, 1958 J. P. H. KING ET AL 2,862,350
PROCESS AND APPARATUS FOR PRODUCING PELLETS
FROM THERMOPLASTIC SHEET MATERIAL
Filed May 24, 1955
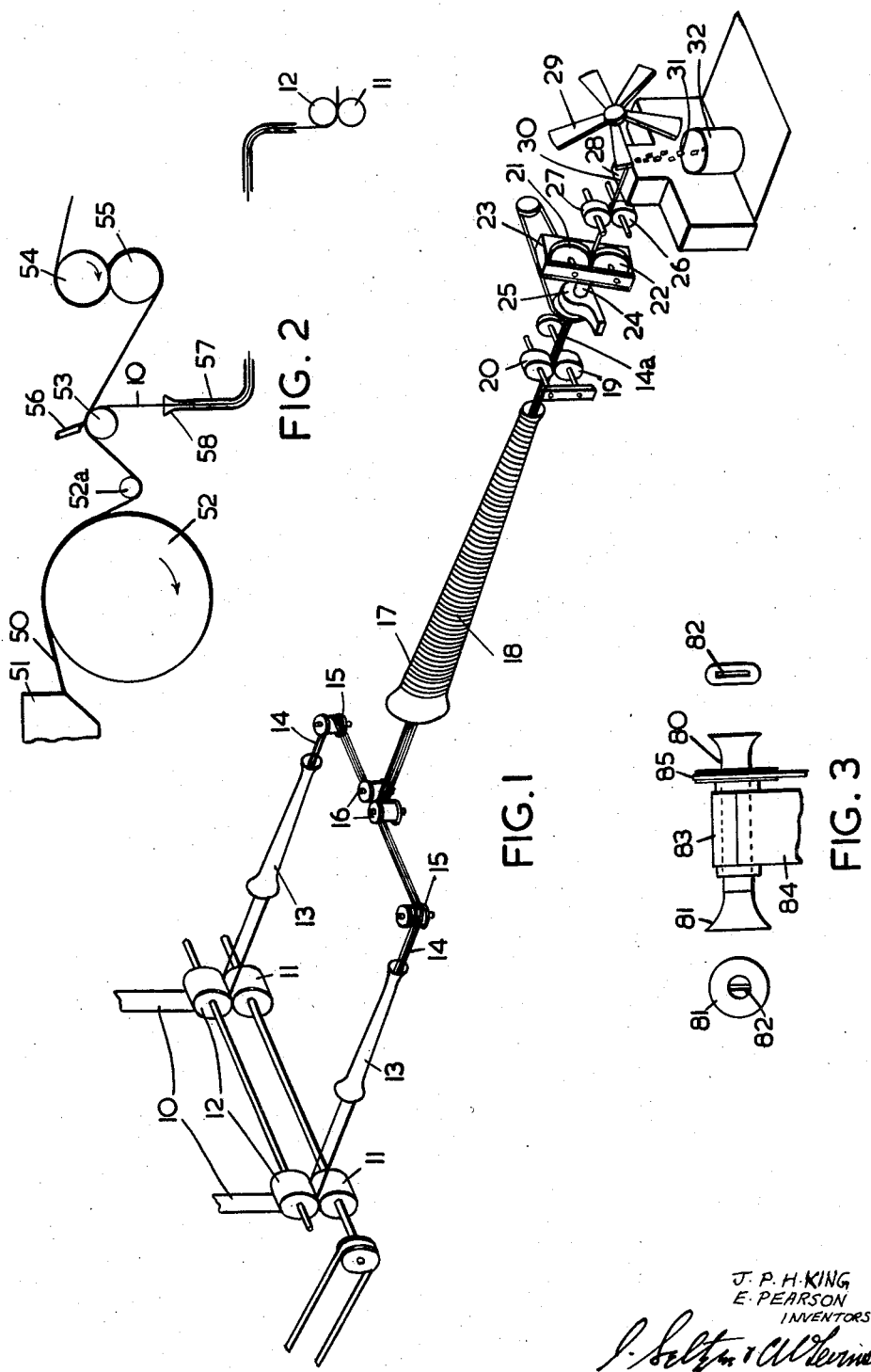
J. P. H. KING
E. PEARSON
INVENTORS
ATTORNEYS United States Patent Office 2,862,350
Patented Dec. 2, 1958

2,862,350

PROCESS AND APPARATUS FOR PRODUCING PELLETS FROM THERMOPLASTIC SHEET MATERIAL

John Philip Henry King, Wrexham, North Wales, and Eric Pearson, Reading, England, assignors to British Celanese Limited, a corporation of Great Britain Application May 24, 1955, Serial No. 510,638

Claims priority, application Great Britain May 26, 1954

6 Claims. (Cl. 57—34)

This invention relates to thermoplastic materials, and in particular to a method for the treatment of themoplastic ribbon-like products.

In making thermoplastic film, it is usually necessary to trim the edges off the film. In one method of making such film, the thermoplastic material is continuously extruded from a heated screw extruder through an orifice having the form of a slot, through a short airspace on to a casting roller, maintained at a temperature at which the thermoplastic material is no longer fluid. After passing partly round the casting roller, the thermoplastic material is drawn continuously away along a further run through the air, in the course of which its edges are trimmed by a pair of suitably spaced knives, and the trimmed film is spooled. One of the objects of the present invention is to provide a method of converting the trim removed from the film in this way into a form particularly suitable for re-use in extrusion or for use in moulding processes. To this end we have devised a method wherein the trim, continuously with its production, can be shaped and consolidated and converted from a relatively thin ribbon to a thicker and narrower rod, which may then be cut into pellets of convenient size. The method is applicable generally in converting thermoplastic material in the form of thin narrow strips in continuous lengths, into a form suitable for moulding.

The process of the invention comprises as a continuous operation performed on the material while it is travelling: forming the material into a multilayer strand, forming said strand into a substantially solid rod while the material thereof is in a heat-softened condition, and cutting the rod transversely into pellets.

There are various ways of carrying out the process of the invention. The strip material can for instance be formed into a multilayer strand by drawing it through a stationary funnel guide the mouth of which is preferably at least as wide as the strip (e. g. 1 to 2½″ diameter) and which tapers to the diameter required in the strand (e. g. ⅛ to ⅜″). The material may be heated to the necessary degree of softness immediately before or during passage through this guide and on leaving the guide may if desired be farther consolidated by passage while still soft, through a die or series of dies before being cut into pellets. Stationary dies are apt to impose on the material frictional forces which it cannot withstand in the highly heat-softened condition. These forces can be reduced by rotating the die or dies about the path of the material or preferably by substituting for the stationary die a pair of grooved rolls through the groove in which the material passes. It is also of advantage for the preliminary stages of the operation of forming into a multilayer strand, or the whole of that operation, to be carried out while the travelling material is still unheated, the strand being heated and consolidated into a rod during its farther travel.

Thus the formation of the strip into a multilayer strand can be effected by drawing it past converging guide surfaces and/or through a series of die apertures, or apertures between pairs of rolls, of successively diminishing size. We have found it of advantage, however, to insert twist in the strand during or after its formation and while it is in the heat-softened condition, and to forward the material from the twisting station to the cutting station (where it is cut into pellets) in such a way that the twist, or part of the twist, inserted is retained. The material may for instance be drawn away from the twisting device by a pair of rolls which permit rotation of the twisted strand or rod of material while exerting sufficient friction to forward it to the cutting station, where it is cut into pellets as it emerges from the pass of the rolls.

It is usual to trim both edges of the film continuously with extrusion and we have found it of great advantage to form a single rod by combining the two trims so obtained. This may be done by bringing together the two trims travelling away from the trimming station, preferably after each has been formed into a multilayer strand without heat, causing them to travel along a common path, and, along this path, heating them to a temperature at which they are soft, twisting them together and forming the assembly into a substantially solid rod of substantially circular cross-section while they are still soft. The rod so formed, in the course of its further travel, is cut transversely into pellets of the desired length. Thus, for example, in trimming the edges of an extruded sheet of width about 30″, there may be obtained from each edge a trim of average width about 1″. Each trim may be continuously drawn away from its respective trimming point, folded laterally to form a strand having a maximum cross-sectional dimension of about ¼″, and the two strands may be drawn together, and, while in a plastic condition, may be twisted and consolidated into a rod about ⅛″ diameter. In the further course of its travel, this rod may be cut into pellets about ⅛″ long.

As indicated above, the folding may be effected by various means, e. g. by drawing the trim past suitable stationary or moving guide surfaces. Thus, for example, each trim may be drawn in turn through suitably shaped apertures in a series of die plates or in a series of pairs of profiled rolls. Skew rolls may also be employed in the folding. The preferred method of effecting the desired folding, however, is to draw the trim through a smooth, funnel-shaped guide, the mouth of the funnel facing the direction of approach of the drum and being larger in diameter than the maximum width of the trim, the narrow, forward-facing end of the funnel being less than one half and preferably less than one quarter of said width.

Various methods of effecting the twisting may be employed. A method that has been found very satisfactory is to draw the assembly through the pass between a pair of rolls mounted, to rotate about parallel axes perpendicular to the direction of travel of the product, in a frame which itself rotates about an axis coincident with that direction. The twisting rolls are urged together and profiled with a V-groove so as to grip the material without flattening it. The material emerging from the twisting rolls is guided or forwarded (according as the twisting rolls are driven or freely rotatable) to a suitable chopping device. By providing for rotation of the material about its axis after it emerges from the twisting frame, permanent twist is inserted. An arrangement found satisfactory for the purpose when the twisting rolls are driven is to provide for the material issuing from the twisting frame a stationary tube guide, or a pair of freely rotatable rolls profiled to allow the material to pass through the aperture between them without being gripped, so tightly as to prevent rotation, to guide the material to a point at which the chopping is effected by a windmill-type cutter. Driving of the twisting rolls, however, is a complication that can be avoided provided that other means are provided for forwarding the material from them to the cutting station. Thus, for example, when a tube guide is employed between the twisting frame and the cutter, a current of air may draw the material along that guide, so making it unnecessary to drive the twisting rolls. Or, as described above, a pair of draw-off rolls may be employed which, while forwarding the material to the cutting point, do not prevent it rotating.

Instead of twisting the material by passage through a twisting frame of the kind described other forms of twisting device may be employed. One such device comprises a tube extending along the path of the material and mounted to rotate about its axis, said tube having a flared mouth to receive the material and means inside for engaging the material so that rotation of the tube inserts twist therein, and means for rotating the tube.

We have found that apparatus in which a twisting device is provided between the means for bringing a plurality of folded ends together and the cutting means, can be operated with useful effect even if free rotation of the material emerging from the twisting device is so impeded, so that at least some of the twist inserted by that device comes out in the further progress of the material. Twist inserted while the material is in a heat-softened condition even though not all of it be retained has a useful effect in the consolidation of the material. The amount of twist in the rod which is cut transversely to form the moulding pellets may with advantage lie between 1 and 4 turns per inch.

Twist may be inserted with advantage even when a single trim or other strip is being operated upon, but we prefer to twist at least two strips running side by side together. On the other hand, more than two strips may be folded and the resulting strands brought together, and caused to pursue a common path in the course of which they are consolidated, preferably with twist.

In carrying out the process of the invention, control of the plasticity of the material at various stages in its progress is important. A suitable degree of plasticity along the appropriate parts of its path facilitates consolidation of the material as well as folding and twisting. By arranging for suitable increases in the linear speed of the material along its path, the material can be stretched to various extents along those parts of the path in which it is in a heat-softened condition. In general there should be no stretch before the folding operation, and high stretch leading to a high degree of molecular orientation is preferably avoided. It is unnecessary and generally undesirable that the trim should show substantial plasticity before reaching the first guide funnel or other folding means. During folding, however, some degree of plasticity is of advantage. This may be obtained, for instance, by directing hot air on to the travelling trim just before it reaches the folding means, and/or by supplying heat to the folding means themselves. Thus, for instance, when the folding is effected by drawing the material through a guide funnel this may be heated by electric resistance heaters, or by means of a fluid-heating jacket, provision being made for accurate temperature control. Other surfaces in contact with which the material passes immediately before or during folding and consolidation may be heated by such means or by radiant heat. When, as in the preferred form of the invention, two or more folded strands are brought together and carried together through a twisting device, it is very desirable that the material should reach the twisting device in a heat-softened condition. Hence there is interposed between the guide means by which two strands are brought together and the twisting means, appropriate means for heating the material. This may comprise a heated funnel guide. Beyond this it is of advantage to provide a pair of nip rolls serving both to draw the material continuously out of the heated funnel guide and also to prevent the twist inserted by the twisting means from running back unduly far along the material. Such nip rolls may also be heated. On the other hand, it is unnecessary that the material should be plastic on approaching this heated funnel. It is generally unnecessary for the twisting rolls or other surfaces contacting the material to be heated, and it is generally advantageous for the material to be at a temperature at which it is no longer plastic in travelling from the twisting device to the cutter. Although in the preferred form of the invention, operating on plasticised cellulose acetate, the rod is preferably cut into pellets at a temperature at which it is no longer soft, this is not essential and the invention includes cutting the material (and feeding it from the twisting device) at a temperature at which it is soft.

Although it is preferred to twist the folded strands, a useful degree of consolidation may be effected by other means. They may, for instance, be consolidated by passage in the heat-softened condition through a succession of apertures of progressively decreasing size in a series of pairs of nip rolls, or by being drawn in that condition through die apertures of appropriate size.

The consolidation effected is preferably sufficient to reduce the folded strand to a substantially solid rod of substantially circular cross-section. This is not, however, an essential for obtaining useful products. By operating the various shaping and consolidating operations, and especially the twisting, at lower temperatures and/or under lower stresses, and by adjusting the areas of the various apertures through which the material passes so as to provide for a smaller decrease in said areas along the path, materials can be obtained which, without being solid throughout, are sufficiently compact to be cut into satisfactory granules for moulding or extrusion.

Folding has been described as a useful preliminary in the consolidation process. Certainly where the trim operated upon is relatively thin and wide, e. g. from less than 2 mils to, say, 20 mils thick and at least ½" wide, we have found folding the best means of commencing the consolidation. The folding may be into helical form or into zig-zag form. Twisting may be applied without a preliminary folding operation, especially with trims in which the ratio of thickness to width is substantially greater than is shown by the figures specified above.

Apparatus according to the invention is shown by way of example in the accompanying diagrammatic drawings wherein:

Fig. 1 is a perspective view of apparatus for forming a rod from two strips trimmed from a film during extrusion, and cutting the rod into moulding pellets;

Fig. 2 is a view in elevation showing the trimming of the film; and

Fig. 3 shows in elevation a tube twisting device that can replace the roll twisting frame shown in Fig. 1.

The apparatus shown in Fig. 1 provides for operating simultaneously upon the two trims 10 cut from the two edges of a film of thermoplastic material during the formation of that film by extrusion of hot thermoplastic composition from a screw extruder. From each trim there is provided in succession: a pair of nip rolls 11, 12 for drawing the trim away from the point at which it is cut from the sheet, one roll 11 of the pair being positively driven and the other 12 being adjustably spring-loaded and idle; a funnel guide 13 to receive the trim emerging from the nip rolls and fold it transversely about itself into a strand 14 of greater thickness and smaller width; a freely rotatably guide pulley 15 for guiding the material from the nip rolls through the center of the funnel guide; and a second rotatable guide pulley 16 for directing the material to a point in the plane of the axes of the funnel guides for the two trims midway between said axes and in advance of the funnel guides. Thus, each trim is continuously drawn by the appropriate set of nip rolls from the point at which it is cut from the extruded sheet, passes through the funnel guide, where it is folded transversely upon itself and reduced to the form of a relatively thick, narrow, multi-layer strand, and the two folded strands formed in this way from the two trims are brought together by the second pair of rotatable guide pulleys 16 at a point midway between the directions of the paths they have pursued from the nip rolls to the first guide pulleys. The funnel guides taper from about 1½″ diameter (substantially greater than the maximum width of the trim) at the inlet end to about ¼″ (i. e. less than one third of said width) at the outlet end.

Beyond the second pair of guide pulleys there is located a further funnel guide 17 provided with an electric resistance heating jacket 18 the temperature of which can be regulated between 120 and 200° C. Through this guide the two folded strands travel in a direction parallel to that between the nip rolls and the first guide pulley.

Beyond the forward end of the funnel guide 17 there is provided a further set of nip rolls 19, 20 for drawing the material away from the funnel. These nip rolls are profiled so as to grip and compress the material without flattening it. The lower roll 19 is driven, the upper roll 20 is adjustably spring loaded and idle. Beyond these nip rolls there is provided a twisting frame comprising a further pair of profiled (V-grooved) nip rolls 21, 22, housed in a frame 23 which is rotated about an axis coincident with the direction of the material through the heated funnel and the nip rolls. This frame is carried by a hollow shaft 24, through the center of which the material 14a passes to the aperture between the rolls, this hollow shaft being journalled in a bearing 25 carried by the fixed frame of the machine. The rolls of the twisting frame are freely rotatable and adjustably spring loaded. Beyond the twisting frame there is provided a further pair of profiled rolls 26, 27 to draw the material away from the twisting frame and forward it over an anvil 28 to the cutter 29. The lower roll 26, of this pair is driven and the upper roll 27 is idle and spring loaded. The compression is adjustable so that the rolls 26, 27 exert the necessary drawing and forwarding action without preventing rotation of the rod 30 formed from the strands 14. The cutter 29 is of the windmill type but other forms of cutter that do not prevent rotation of the rod while it is being cut can be used. The cutter 29 cuts the rod 30 into pellets 31 of the desired length, e. g. ⅛–⅜″ which fall into the container 32.

The driving means for the various driven rolls are such as to enable these rolls to be driven at linear speeds ranging from 10 to 150 ft./min. The driving means for the twisting frame enables this to be driven at speeds ranging from 100 to 5000 R. P. M.

Referring now to Fig. 2, this shows a hot-extruded film 50 of plasticized cellulose acetate emerging from the die 51 of a screw extruder and running onto an attemperated casting roll 52, from which it is stripped by a stripping roll 52a, after which it passes over the trimming roll 53 to draw-off rolls 54, 55 and thence to take-up means which are not shown. At the trimming roll two knives 56, a predetermined distance apart across the width of the film, trim the two edges of the film by cutting from each a strip 10. Each of these strips 10 is sucked by a rapid flow of air on the ejector principle through a tube guide 57 having a flared mouth 58 and delivered from said tube guide just above the rolls 11, 12 which are shown in Fig. 1. From there onwards the path of the material trimmed from the sheet is as described above in connection with that figure.

The alternative twisting device shown in Fig. 3 comprises a tube 80 having a flared mouth-piece 81 and terminating in a slot 82, this tube being journalled in a bearing 83 carried by a fixed support 84. Fast on the tube 80 is a pulley driven by a band 85 from driving means (not shown) which enable the tube to be driven at speeds ranging from 100 to 5000 R. P. M.

In one form of apparatus the twisting device shown in Fig. 3 is substituted in the lay-out of Fig. 1 for the twisting frame shown therein. In the operation of this alternative arrangement the assembly 14a of two heat-softened strands emerging from the nip of the feed rolls 19, 20 of Fig. 1 enters the mouth 81 of the rotating tube 80 and in passing through that tube towards the draw rolls 26, 27 of Fig. 1 is engaged by the sides of the slot 82 at the forward end of the tube and rotated. This twists the two strands together and owing to their heat-softened condition they partially coalesce.

The following examples illustrate the invention:

*Example 1*

The apparatus was as shown in Figs. 1 and 2.

The film being extruded was of cellulose acetate of acetyl value (expressed as acetic acid) between 53 and 54%. The temperature at the die was 190° C., the casting roll temperature was approximately 100° C., the film leaving the casting roll was of average thickness 8 mils and average width 27½″ and was travelling at approximately 15 ft./min. and these dimensions and speed were substantially the same at the trimming roll, where the temperature of the film was estimated at about 60° C. The trimming knives were set 26″ apart.

After the starting extrusion the strips trimmed from the sheet were drawn through the suction tube guides from the trimming points and allowed to run to waste until the extrusion conditions were stabilised. Then the nip rolls 11, 12 were set in motion and run at the same linear speed as the casting drum. The nip rolls 19, 20 were then set in motion and run at a linear speed somewhat greater (e. g. 5 to 20% greater) than that of the casting drum and the nip rolls 26, 27 were run at a speed slightly (e. g. 5 to 10%) greater still. With the twisting frame stationary each trim was threaded through the appropriate set of nip rolls 19, 20 and funnel guides 13, round the guide pulleys 15 and 16, through the heated funnel guide 17, through the nip between the twisting rolls 21, 22 and finally between the nip rolls 26, 27. The temperature of the heating jacket 18 was then adjusted so that the material emerging therefrom was in a soft, self-adhesive condition. The twisting frame was then set in motion while drawing the composite strand by hand (and allowing it to rotate) away from the cutter block with the cutter stationary and its knives out of the way, and the speed of rotation of the frame was adjusted until the product contained about 3 turns per inch of twist. Finally the cutter was set in motion and its speed adjusted to give pellets of the desired length (⅛″ to ¼″). The apparatus, once the temperatures had become steady, continued to operate satisfactorily, and produced moulding granules in the form of substantially cylindrical, substantially solid pellets composed of a number of layers partially coalesced.

*Example 2*

The apparatus was shown in Figs. 1 and 2 except that the twisting tube of Fig. 3 was substituted for the twisting frame of Fig. 1.

The film extruded was of the same width as before but had a thickness on leaving the casting drum of 1 mil and its linear speed at that point was 130 ft./min. the speeds of the various nip rolls were adjusted accordingly, giving a slight increase in speed along the path of the material as explained in Example 1, and the twisting tube was run at such a speed as to give a product containing about 1½ turns per inch of twist.

The method of the invention, and apparatus generally similar to that described, can be used in dealing with trims cut from solvent-cast sheet or cut from a sheet while being drawn from one spool on to another, and is applicable generally in converting ribbons of thermoplastic material into pellets. The trims or other ribbons treated may, for example, range in thickness from about 0.5 mil to about 50 mils, preferably 1 to 10 mils, and in width from about ½″ to about 2½″ preferably ¾″ to 2″. In the preferred form of the invention two such strips are twisted together hot, after folding each into a strand of ⅜″ maximum cross-sectional dimension, to form a substantially solid substantially cylindrical rod in which the layers are twisted to the extent of 1 to 5, especially 2 to 4, turns per inch and are partially coalesced, and the rod is cut into pellets ⅛″ to ⅜″ long.

The invention has been described with particular reference to the treatment of ribbons of cellulose acetate. In a similar way ribbons of other organic substitution derivatives of cellulose may be treated. Such derivatives include cellulose ethers such as ethyl cellulose and benzyl cellulose, and cellulose esters, especially celluose esters of paraffinic monocarboxylic acids containing two to four carbon atoms, e. g. cellulose propionate, cellulose acetate-propionate, cellulose butyrate and cellulose acetate-butyrate. Similarly ribbons of thermoplastic vinyl and vinyldiene polymers can be treated, such as polyvinyl chloride, polyvinyl chloride-acetate, and copolymers of vinyl chloride with vinylidene chloride and of vinyl or vinylidene chloride with methacrylonitrile. Plasticisation of these various thermoplastic materials will in general be required for the process of the invention as for hot extrusion in the absence of volatile liquids. High-molecular thermoplastic polymers (including copolymers) of ethylene can also be used. A further class of thermoplastic material of which trims or other ribbons for use in the process of the invention may be composed is that of condensation high polymers such as nylon-66, nylon-6, nylon-610, the poly 1,4-iminotriazoles and polyethylene terephthalate. The process is, in fact, generally applicable to the treatment of ribbons of thermoplastic compositions suitable for hot extrusion in the absence of volatile liquids.

Having described our invention, what we desire to secure by Letters Patent is:

1. Process for converting thermoplastic material in the form of thin narrow strips in continuous lengths into a form suitable for moulding, which comprises forming two narrow strips simultaneously and continuously by trimming the two edges of a film of thermoplastic material that is being extruded, continuously drawing away the two strips from the points at which they are cut from said film, folding each of the strips into a multilayer strand while they are travelling, bringing together the two strands while they are travelling and causing them to travel in contact with each other in the same direction, during said travel heating the assembly of strands to a temperature at which the material is soft, twisting the strands together and forming the assembly into a substantially solid rod of substantially circular cross-section while the material is still soft, and cutting the said rod into pellets when the rod is no longer soft.

2. Apparatus for converting thermoplastic material in the form of thin narrow strips in continuous lengths into a form suitable for moulding, which comprises in combination with means for continuously trimming the edges of a travelling film of thermoplastic material, means for drawing two strips of the thermoplastic material simultaneously along predetermined paths, means along each of said paths for forming the strip travelling along that path into a multilayer strand, means for bringing the said strands together and drawing them along a common path, and, situated along said common path, means for heating the material at a temperature at which it is soft, means for twisting the strands together and forming them into a substantially solid rod of substantially circular cross-section while the material is still in the heat-softened condition, and means for cutting said rod transversely into pellets when the rod is no longer soft.

3. Apparatus for converting thermoplastic material in the form of thin narrow strips in continuous lengths into a form suitable for moulding, which comprises means for drawing two strips of the thermoplastic material simultaneously along predetermined paths, means along each of said paths for forming the strip travelling along that path into a multilayer strand, said means comprising a funnel guide having its mouth facing the direction of approach of said strip, means for bringing the said strands together and drawing them along a common path, and, situated along said common path, means for heating the material at a temperature at which it is soft, means for twisting the strands together and forming them into a substantially solid rod of substantially circular cross-section while the material is still in the heat-softened condition, and means for cutting said rod transversely into pellets when the rod is no longer soft.

4. Apparatus for converting thermoplastic material in the form of thin narrow strips in continuous lengths into a form suitable for moulding, which comprises means for drawing two strips of the thermoplastic material simultaneously along predetermined paths, means along each of said paths for forming the strip travelling along that path into a multilayer strand, means for bringing the said strands together and drawing them along a common path, and, situated along said common path, means for heating the material to a temperature at which it is soft, means for twisting the strands together, said means comprising a pair of rolls extending across and perpendicular to the path of said material, said rolls being mounted in a frame adapted to rotate so that the axes of the rolls revolve about said path, and being urged together, the rolls having registering peripheral V-grooves, the sides of which are adapted to grip the material travelling along said path so that rotation of the frame inserts twist in the material, and means for rotating the frame, means for forming said twisted strands into a substantially solid rod of substantially circular cross-section while the material is still in the heat-softened condition, and means for cutting said rod transversely into pellets when the rod is no longer soft.

5. Apparatus according to claim 4, including a pair of feed rolls for feeding the heat-softened material to the twisting means, a pair of draw-off rolls for drawing the twisted product away from the twisting means, said draw-off rolls allowing rotation of said product about its axis while urging it along, and a device for cutting said product into pellets as it emerges from the pass between said draw-off rolls.

6. Apparatus for continuously trimming the edges of a travelling film of thermoplastic material, with means for converting the two strips trimmed from the respective edges of said sheet into a form suitable for moulding, continuously with the trimming operation, which includes two funnel guides situated parallel to each other, the mouth of each guide being at least 1 inch in diameter and said guide tapering to a diameter of ⅛ inch to ⅜ inch, means for feeding to each guide the strip trimmed from one edge of the film continuously with the trimming operation, means for drawing the material from the funnel guides, means for bringing together the two strips emerging from the respective funnel guides and causing them to follow a common path, a heating jacket embracing said common path, twisting means beyond said jacket, said means comprising a pair of rolls extending across and perpendicular to the path of said material and being urged together, said rolls being mounted in a frame adapted to rotate so that the axes of the rolls revolve about said path, the rolls having registering peripheral V-grooves the sides of which are adapted to grip the material travelling along said path so that the rotation of the frame inserts twist in the material, and means for rotating the frame, a pair of rolls for drawing the hot product away from said tube-end and forwarding it while still soft to said twisting device, a pair of draw-off rolls for drawing the twisted product away from the twisting means, said draw-off rolls urging it along, and a device for cutting said product into pellets as it emerges from the pass between said draw-off rolls.

References Cited in the file of this patent

UNITED STATES PATENTS

| | | |
|---|---|---|
| 2,319,040 | Conklin | May 11, 1943 |
| 2,336,100 | Jacque | Dec. 7, 1943 |
| 2,464,746 | Gering | Mar. 15, 1949 |
| 2,545,869 | Bailey | Mar. 20, 1951 |
| 2,569,083 | Wilhelm | Sept. 25, 1951 |
| 2,600,686 | Piperoux et al. | June 17, 1952 |
| 2,666,976 | Olmer et al. | Jan. 26, 1954 |